United States Patent
Wieczorek et al.

(10) Patent No.: US 7,025,400 B2
(45) Date of Patent: Apr. 11, 2006

(54) VISOR NAIL

(75) Inventors: Joseph P. Wieczorek, Lake Orion, MI (US); Rodney Slobodian, Sterling Hts., MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 80 days.

(21) Appl. No.: 10/779,224

(22) Filed: Feb. 12, 2004

(65) Prior Publication Data

US 2005/0179282 A1 Aug. 18, 2005

(51) Int. Cl.
*B60J 3/00* (2006.01)

(52) U.S. Cl. .................. 296/97.9; 296/97.11

(58) Field of Classification Search .............. 296/97.1, 296/97.9, 97.11, 97.12, 97.13
See application file for complete search history.

(56) References Cited

U.S. PATENT DOCUMENTS

| 4,417,761 | A | | 11/1983 | Cziptschirsch et al. |
| 4,582,356 | A | | 4/1986 | Kaiser et al. |
| 4,617,699 | A | * | 10/1986 | Nakamura ................. 296/97.9 |
| 4,679,843 | A | | 7/1987 | Spykerman |
| 4,763,946 | A | | 8/1988 | Robbins et al. |
| 4,821,374 | A | * | 4/1989 | Gavagan ................... 296/97.9 |
| 4,902,063 | A | * | 2/1990 | Crink ....................... 296/97.11 |
| 4,925,233 | A | | 5/1990 | Clark |
| 5,031,951 | A | | 7/1991 | Binish |
| 5,031,953 | A | * | 7/1991 | Miller ....................... 296/97.9 |
| 5,169,203 | A | | 12/1992 | Lawassani et al. |
| 5,338,083 | A | * | 8/1994 | Gute ........................ 296/97.9 |
| 5,409,285 | A | | 4/1995 | Snyder |
| 5,411,310 | A | | 5/1995 | Viertel et al. |
| 5,466,405 | A | | 11/1995 | Viertel et al. |
| 5,498,056 | A | * | 3/1996 | Viertel et al. ............. 296/97.9 |
| 5,603,547 | A | | 2/1997 | Finn et al. |
| 5,653,490 | A | | 8/1997 | Fink et al. |
| 5,716,092 | A | | 2/1998 | Dellinger et al. |
| 5,887,933 | A | | 3/1999 | Peterson |
| 6,010,175 | A | * | 1/2000 | Bodar et al. ............. 296/97.11 |
| 6,024,399 | A | * | 2/2000 | Viertel et al. ............ 296/97.11 |
| 6,059,348 | A | | 5/2000 | Viertel et al. |
| 6,093,277 | A | | 7/2000 | Assink et al. |
| 6,131,985 | A | | 10/2000 | Twietmeyer et al. |
| 6,220,644 | B1 | * | 4/2001 | Tiesler et al. ........... 296/97.11 |
| 6,438,804 | B1 | | 8/2002 | Magarino |
| 6,454,507 | B1 | | 9/2002 | Magarino |
| 6,530,773 | B1 | | 3/2003 | Bearman et al. |

\* cited by examiner

*Primary Examiner*—Lori L. Coletta
(74) *Attorney, Agent, or Firm*—Raggio & Dinnin, P.C.

(57) ABSTRACT

Sun visor for a motor vehicle has a nail substantially parallel a longitudinal edge of a clamshell visor half and driving the nail through a clip rod positioned in a clip rod recess. The nail is driven by sliding a visor pivot rod or attached slider against one end thereof, driving the nail through the clip rod and securing the same in the recess.

5 Claims, 2 Drawing Sheets

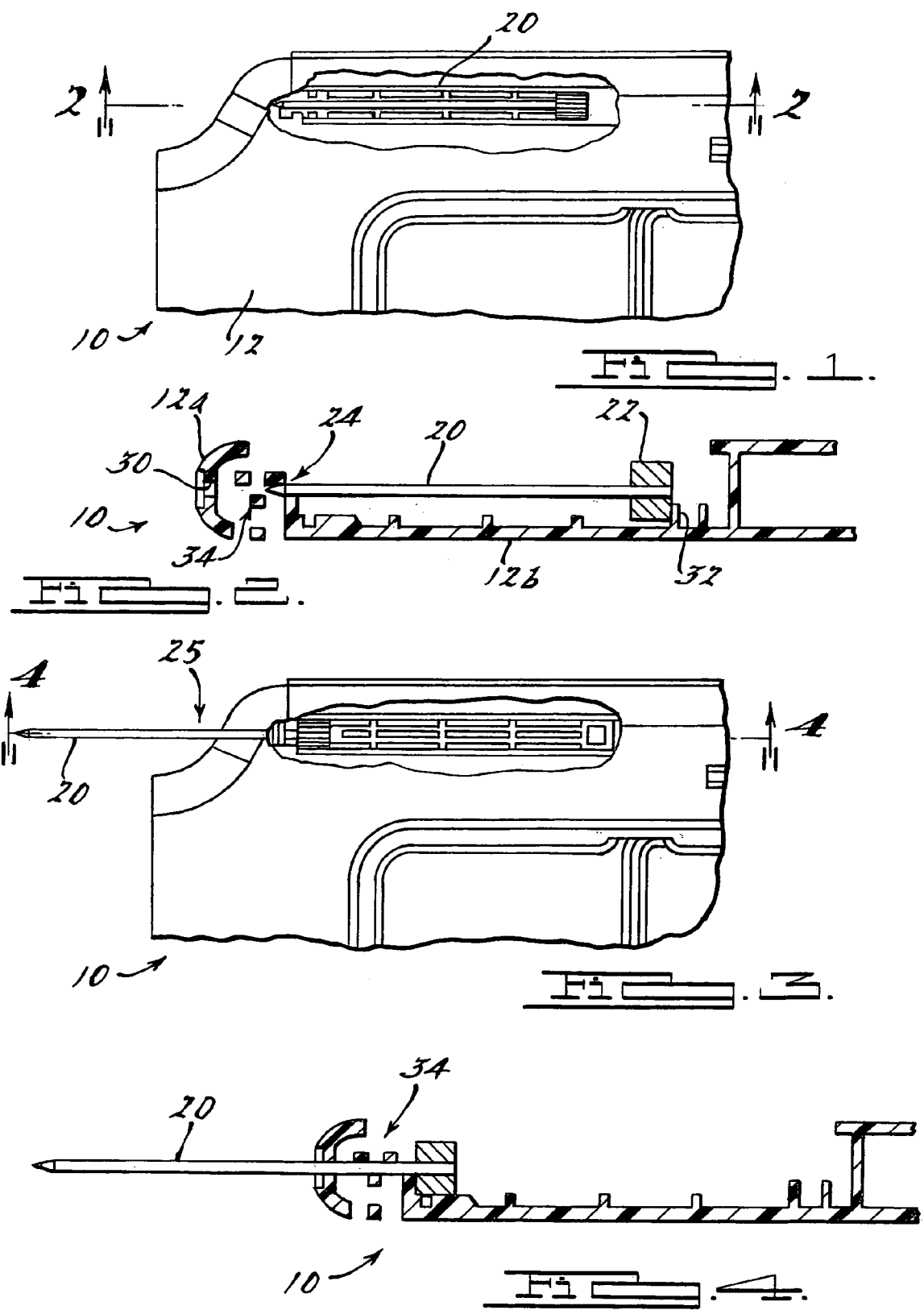

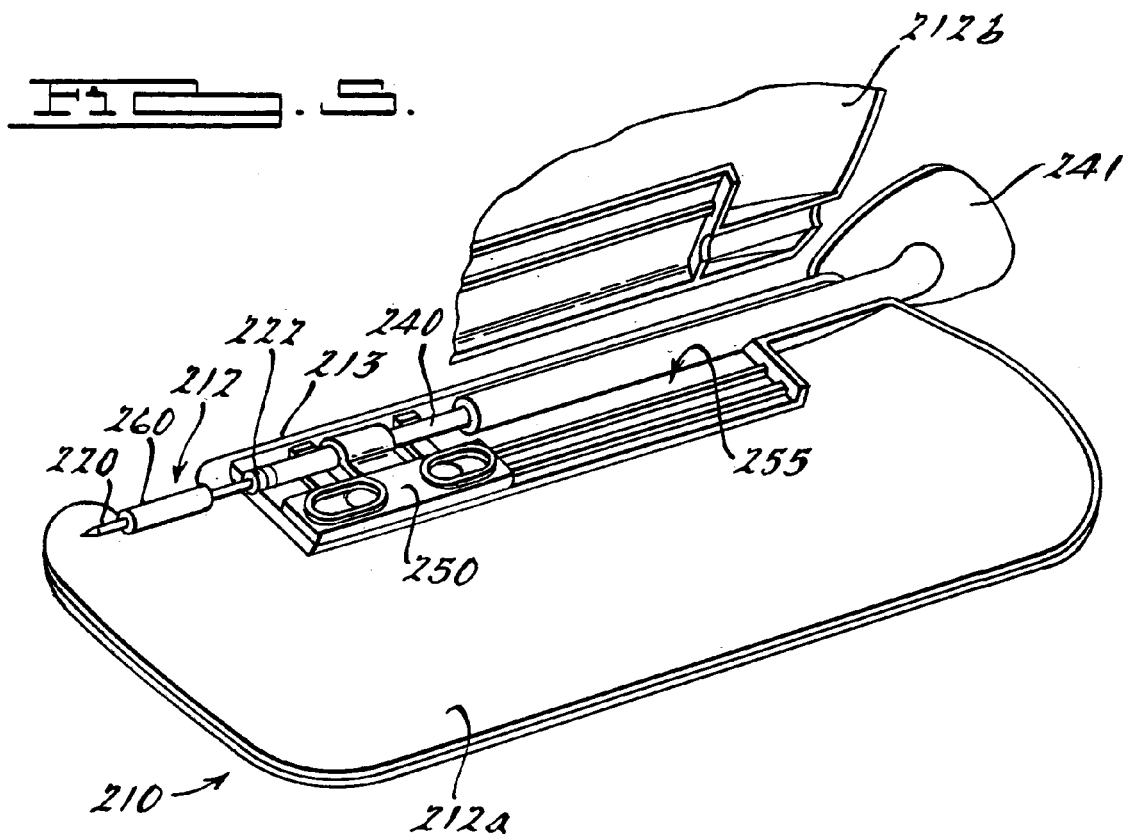
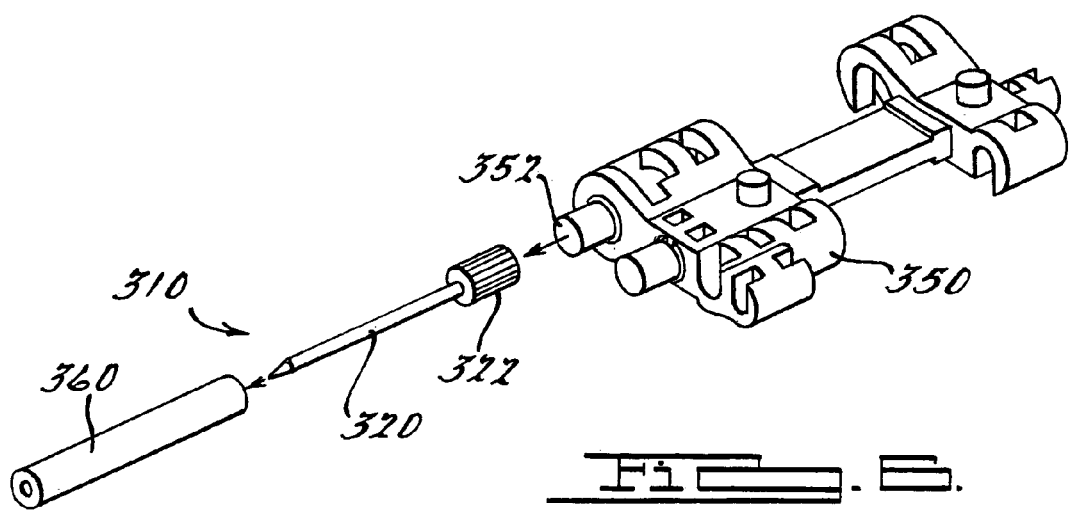

VISOR NAIL

TECHNICAL FIELD

The present invention relates generally to adjustable sun visors for use in motor vehicles, and relates more particularly to a method and design for a visor wherein during assembly a nail member is driven across a recess in a body of the visor and longitudinally through a clip rod to secure the clip rod in the recess.

BACKGROUND OF THE INVENTION

Sun visors are well known and widely used, and a great many designs have been successfully employed in vehicles over the years. Engineers have developed a variety of ways by which visor bodies and other interior components may be constructed and mounted in a vehicle to enhance functionality or aesthetic appeal. Advances in design, however, can often add complexity to the manufacturing process for interior components. There has been and continues to be a premium in the automotive industry on cost savings, and improvements in the efficiency and speed of manufacturing processes are often welcomed by the industry. An area of particular focus in automobile technology has been reducing the number and complexity of steps required to assemble interior components such as visors.

Many visors are constructed with a "clamshell" type design, involving the molding of two plastic shell pieces or clamshell halves which are joined to form the visor body. Upholstery coverings are then typically mounted over the visor body. The clamshell design allows the visor body to be constructed relatively quickly and easily, however, the various components attached to the visor clamshell halves must in some cases be incorporated with several assembly steps prior to securing the clamshell halves together. For example, several known designs require multiple mounting or securing steps to position and retain the visor clip rod in a recess in the visor body. The construction of visors having such a design is relatively time intensive. Eliminating parts and steps in assembly can reduce the expense of manufacturing and constructing the visor. It is thus desirable to provide a design wherein a component such as the visor clip rod can be secured relatively quickly and easily during manufacturing.

SUMMARY OF THE INVENTION

In one aspect, the present invention provides a clamshell visor including first and second visor shells, and a clip rod. During assembly a nail member is driven across a recess and through the clip rod, securing it in position. The nail is preferably driven with a slider mechanism attached to the visor pivot rod, or with the pivot rod itself.

In another aspect, the present invention provides a method of manufacturing a sun visor for a motor vehicle. The method includes the steps of positioning a nail substantially parallel a longitudinal edge of a visor shell, and driving the nail through a clip rod positioned in a clip rod recess in the visor shell. The nail is preferably driven by sliding a visor pivot rod or an attached member against one end thereof, thereby driving the nail through the clip rod and securing the same in the recess.

BRIEF DESCRIPTION OF THE DRAWINGS

FIG. 1 illustrates a visor shell having a nail positioned therein in a pre-installed position prior to driving the nail through a clip rod, in accordance with a preferred embodiment of the present invention;

FIG. 2 is a sectioned side view taken along line A—A of FIG. 1;

FIG. 3 illustrates a visor shell having a nail positioned therein in an installed position;

FIG. 4 is a sectioned side view taken along line A—A of FIG. 3;

FIG. 5 is a perspective view of a visor according to a preferred embodiment of the present invention;

FIG. 6 is an exploded view of a slider, nail and clip rod according to a preferred embodiment of the present invention.

DETAILED DESCRIPTION OF PREFERRED EMBODIMENTS

Referring to FIGS. 1 and 2 there is shown a visor 10 according to a preferred embodiment of the present invention. Visor 10 includes a visor body 12, with a nail member 20 positioned therein. Nail member 20 preferably includes an enlarged plastic head portion 22, and a sharpened or pointed tip 24. As illustrated in FIG. 2, visor body 12 preferably comprises first and second visor shell halves 12a and 12b. Visor halves 12a and 12b are preferably molded plastic, and are engageable to form a clamshell-type visor body. In a preferred embodiment, visor shell halves 12a and 12b define an aperture 30, through which nail member 20 may be pushed to secure a clip rod, as described herein. In a preferred embodiment visor shell halves 12a and 12b each include a plurality of molded supporting protrusions 34, which guide nail member 20 as it is slid through aperture 30. A molded plastic stop 32, in cooperation with protrusions 34, preferably assists in properly orienting nail 20 when positioned in visor body 12. The present invention broadly provides a method of assembling a visor wherein nail 20 is slid through aperture 30, through a clip rod (not shown in FIGS. 1 and 2), with a slider or pivot rod (also not shown in FIGS. 1 and 2), thereby securing a clip rod in the visor body. FIGS. 3 and 4 illustrate visor 10 with nail member 20 in an installed position, traversing a recess 25.

Referring now to FIG. 5, there is shown a visor 210 with a visor nail 220 that has been pushed across a recess 212, through a clip rod 260, thereby securing the same in recess 212. In the FIG. 5 embodiment, a combination slider and detent mechanism 250 rotatably journals a visor pivot rod 240. During assembly of visor 210, pivot rod 240 and slider 250 are positioned within a channel 255 defined by one or both of the visor shell halves 212a and 212b. To assemble the visor, first and second shell halves 212a and 212b are closed about pivot rod 240 and slider 250 with nail 220 positioned proximate clip rod recess 212. After the shell halves 212a and 212b are engaged, slider 250 and pivot rod 240 can be slid along channel 255, preferably defined in part by first shell half 212a and also in part by second shell half 212b, bringing an end of pivot rod 240 into engagement with enlarged head 222 of nail 220. A technician can grasp one end of pivot rod 240, or a sleeve and mounting assembly 241, and manually push nail 220 across recess 212, captur ing clip rod 260 therein. Prior to engaging visor shell halves 212a and 212b, nail 220 is preferably positioned in visor shell half 212a, and may be supported by supporting protrusions (not shown in FIG. 5) similar to those depicted in FIGS. 1–4.

In a preferred embodiment nail 220 will be oriented substantially parallel with a longitudinal edge 213 of shell half 212a. Similarly, clip rod 260 is preferably oriented substantially parallel longitudinal edge 213. Thus, when an axial force is applied to pivot rod 240, pivot rod 240 can drive nail 220 through clip rod 260. Embodiments are contemplated wherein an inner diameter of clip rod 260 is substantially equal to an outer diameter of nail 220, as well as embodiments wherein the inner diameter of clip rod 260 is larger than an outer diameter of nail 220 such that clip rod 260 is rotatably journaled by nail 220.

Turning now to FIG. 6, there is shown an alternative embodiment of the present invention 310 which includes a clip rod 360, a nail 320, with an enlarged head 322, and a slider 350. In the FIG. 6 embodiment, slider 350 includes a protruding end member 352 that can engage head 322 for pushing of nail 320 into engagement with clip rod 360. In a preferred embodiment, a detent mechanism, for example a clip detent (not shown) may be engaged with slider 350, to rotatably journal a pivot rod (not shown), and hold the pivot rod in alternate raised or lowered positions, in a manner well known in the art.

The present description is for illustrative purposes only, and should not be construed to narrow the breadth of the present invention in any way. Thus, those skilled in the art will appreciate that various modifications might be made to the presently disclosed embodiments without departing from the spirit and scope of the invention. Other aspects, features, and advantages will be apparent upon an examination of the attached drawing Figures and appended claims.

What is claimed is:

1. A sun visor for a motor vehicle comprising:
   a first molded visor shell half having a periphery defining a first arcuate region;
   a second molded visor shell half having a periphery defining a second arcuate region, said second visor shell half engageable with the first shell half to form an elongate visor body having first and second longitudinal ends;
   engagement of said first and second shell halves aligns said first and second arcuate regions to form a recess proximate a corner of said visor body;
   a clip rod spanning the recess;
   a nail member extending through the clip rod and securing the same in the recess, said nail member comprising a first end at a first side of said recess and a pointed second end at a second side of said recess;
   a pivot rod assembly between the first and second visor shell halves and slidable between a first position proximate the first end of said visor and a second position proximate said first side of said recess.

2. The sun visor of claim 1 wherein said first and second shell halves each define a portion of a channel within which the pivot rod assembly slides.

3. The sun visor of claim 1 further comprising supporting protrusions integral with at least one of said first and second visor shell halves and adapted to support the nail member proximate the first side of said recess.

4. The sun visor of claim 3 wherein said pivot rod assembly is slidable across said supporting protrusions and is adapted to drive said nail member through said clip rod.

5. The sun visor of claim 4 wherein said pivot rod assembly comprises an end protrusion adapted to engage with and drive said nail member at said first end thereof.

* * * * *

UNITED STATES PATENT AND TRADEMARK OFFICE
CERTIFICATE OF CORRECTION

PATENT NO. : 7,025,400 B2  
DATED : April 11, 2006  
INVENTOR(S) : Wieczorek et al.

Page 1 of 1

It is certified that error appears in the above-identified patent and that said Letters Patent is hereby corrected as shown below:

<u>Column 2,</u>  
Line 67, delete "captur" and insert -- "captur-" -- after "across recess 212".

Signed and Sealed this

Twenty-seventh Day of June, 2006

JON W. DUDAS  
*Director of the United States Patent and Trademark Office*